(12) United States Patent
Perrin

(10) Patent No.: US 8,162,476 B2
(45) Date of Patent: Apr. 24, 2012

(54) CONTACT LENS

(75) Inventor: Gerard Perrin, Lingolsheim (FR)

(73) Assignee: Laboratoire Precilens (FR)

( * ) Notice: Subject to any disclaimer, the term of this patent is extended or adjusted under 35 U.S.C. 154(b) by 0 days.

(21) Appl. No.: 12/724,877

(22) Filed: Mar. 16, 2010

(65) Prior Publication Data

US 2010/0171924 A1 Jul. 8, 2010

Related U.S. Application Data

(63) Continuation of application No. PCT/FR2008/001125, filed on Jul. 28, 2008.

(30) Foreign Application Priority Data

Sep. 19, 2007 (FR) ......................................... 070683

(51) Int. Cl.
*G02C 7/04* (2006.01)

(52) U.S. Cl. .................................... 351/161; 351/160 R

(58) Field of Classification Search .............. 351/160 R, 351/160 H, 161–162
See application file for complete search history.

(56) References Cited

U.S. PATENT DOCUMENTS

| 5,805,266 A | 9/1998 | Gupta |
| 2003/0151718 A1* | 8/2003 | Marmo et al. ................. 351/161 |
| 2005/0068489 A1* | 3/2005 | Hall et al. ................. 351/160 R |
| 2005/0068490 A1 | 3/2005 | Mandell |

FOREIGN PATENT DOCUMENTS

| EP | 0742462 A2 | 11/1996 |
| GB | 1252288 | 11/1971 |
| GB | 2041557 A * | 9/1980 |
| WO | 03009052 A1 | 1/2003 |

OTHER PUBLICATIONS

International Search Report PCT/FR2008/001125; Dated Apr. 14, 2009.

* cited by examiner

*Primary Examiner* — James Greece
(74) *Attorney, Agent, or Firm* — Cantor Colburn LLP

(57) ABSTRACT

A contact lens includes at least two focal lengths, a single lower bearing surface capable of allowing the lens to be translated relative to an eye, and an area placed in the lower portion of the lens, the area having an outer face connected to a remainder of the outer face of the lens via a recess and the area having an inner face indistinguishable from the rest of an inner face of the lens, where the recess defines the lower bearing surface, and where the area is thin with an average thickness of the same order of magnitude as a thickness of an upper edge of said lens.

13 Claims, 3 Drawing Sheets

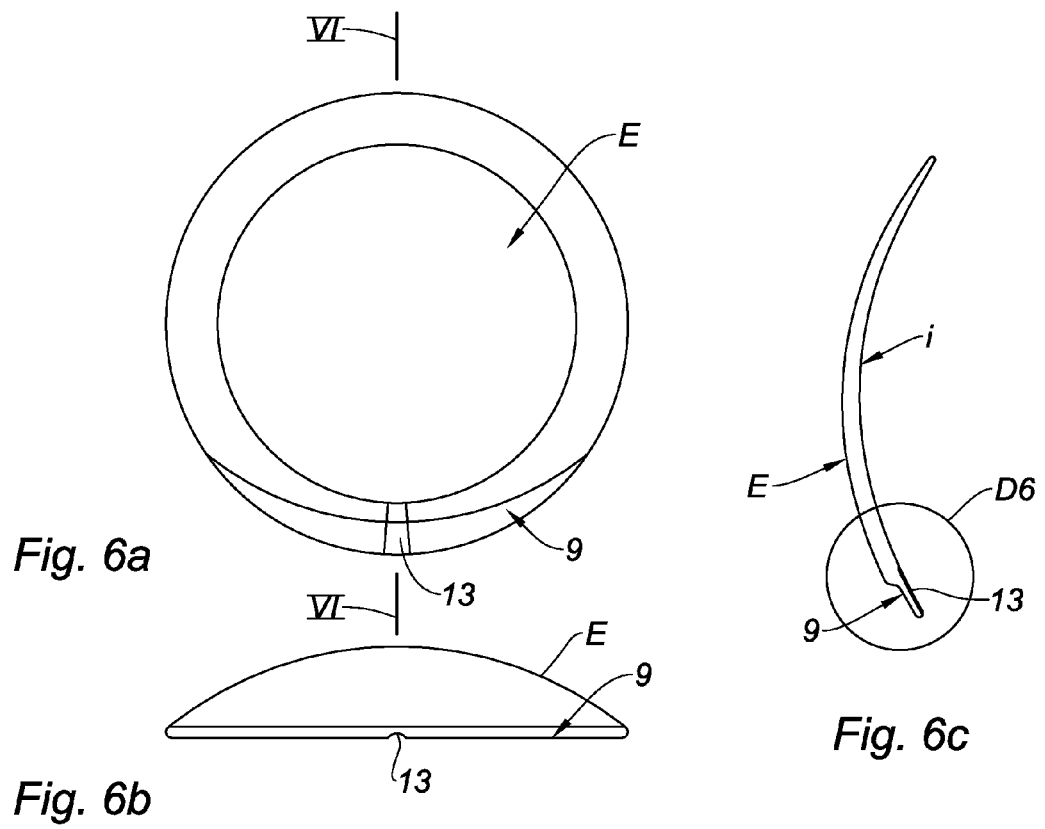
Fig. 6a
Fig. 6b
Fig. 6c
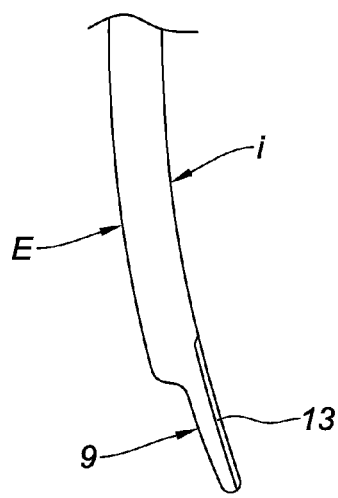
Fig. 6d

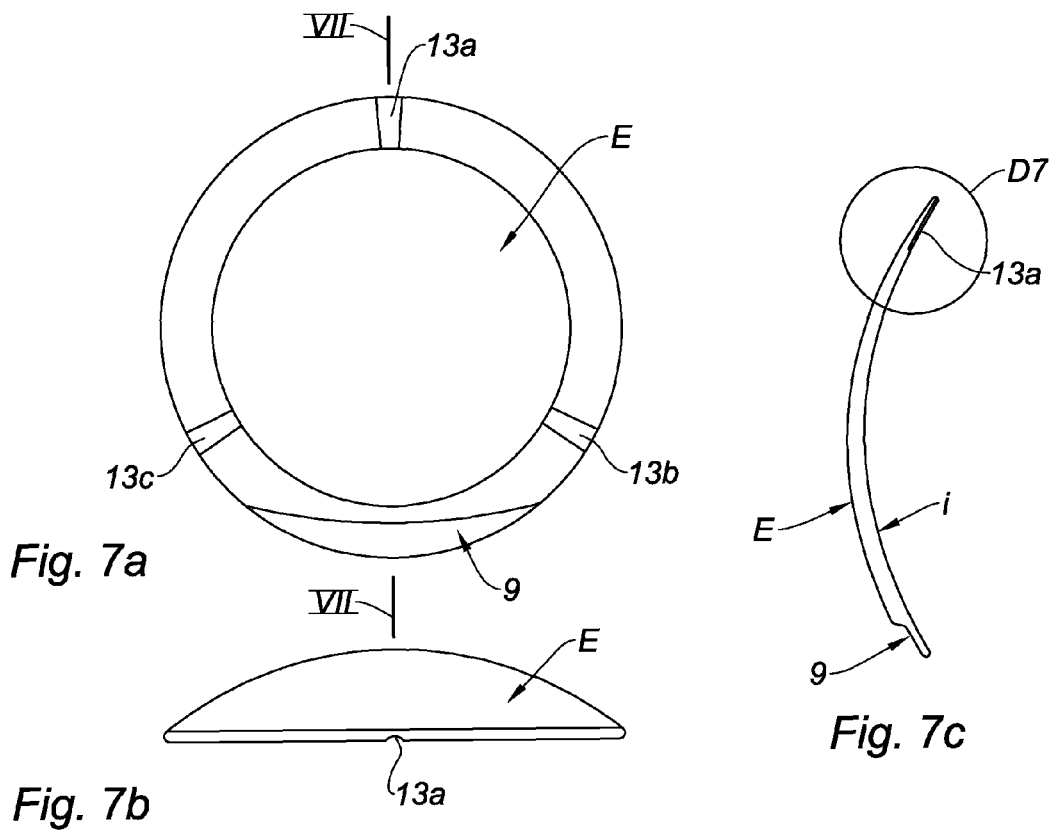
*Fig. 7a*
*Fig. 7b*
*Fig. 7c*
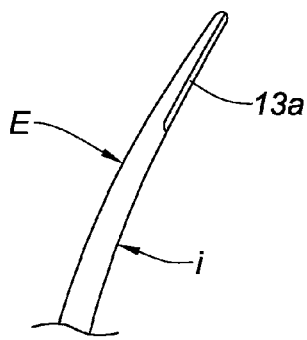
*Fig. 7d*

CONTACT LENS

CROSS REFERENCE TO RELATED APPLICATIONS

This application is a continuation of International Patent Application No. PCT/FR2008/001125 filed on 28 Jul. 2008 which claims priority to French Patent Application Number 07/06572 filed on 19 Sep. 2007, both of which said applications are herein incorporated by reference in their entirety.

TECHNICAL FIELD

The present invention relates to contact lenses and may be used for various types of lenses that have to translate upward and/or stabilize.

BACKGROUND

The principle of stabilizing contact lenses with lower bearing surface, such as that which is shown in FIGS. 1 and 2 appended hereto, is known.

"Lower bearing surface" indicates that the lower edge 1 is sufficiently thick to butt against the edge of the lower eyelid, without passing beneath, unlike the upper edge 3 which, for its part, is "thin", that is to say suitable for passing beneath the upper eyelid.

Because of the abutment of the lower edge of the lens on the edge of the lower eyelid, the possibility is obtained of causing the lens to translate upward when looking downward: this is called "translation" of the lens on the eye.

Moreover, because of this difference of thickness and hence of weight between its lower and upper edges, the lens tends to retain its orientation relative to the eye, that is to say not to turn relative to the latter: it is said that the lens is "stabilized".

These stabilization and translation features make it possible to produce lenses comprising different optical correction zones, the movement of the eye from one to the other of these various zones being obtained by movement of the eye upward or downward.

Such lenses with multiple correction zones may notably be lenses with several focal lengths, used for correcting farsightedness.

To increase the translation of the lens, it is known practice to cut off the lower edge 1, as can be seen in FIG. 1 appended hereto: this lower edge has a curve corresponding substantially to that of the edge of the lower eyelid, thereby forming a sort of flat helping to limit the risks of rotation of the lens on the eye and hence promote stabilization.

These lenses with lower bearing surface, which have a dissymmetry between their upper and lower portions, differ notably from the symmetrical lenses used for the correction of astigmatism, such as, for example, the lens of document EP0742462.

More precisely, while these lenses with lower bearing surface comprise a single bearing surface, placed in the lower portion of the lens, lenses such as that which is described in EP0742462 have two symmetrical bearing surfaces allowing the lens to be held in a centered position relative to the eye (no translation of the lens relative to the eye is desired).

Because of its relative thickness, the lower edge of the lenses with lower bearing surface may create discomfort and lesser physiological tolerance.

BRIEF SUMMARY

The disclosure provides for enhancing the comfort, physiological tolerance and quality of vision.

Particularly, the disclosure provides a contact lens comprising at least two focal lengths, a lower bearing surface capable of allowing this lens to be translated relative to the eye, and an area placed in the lower portion of the lens, this area having an outer face connected to the rest of the outer face of the lens via a recess and an inner face indistinguishable from the rest of the inner face of the lens, said recess defining said lower bearing surface, this lens being noteworthy in that said area is thin, that is to say that it has an average thickness of the same order of magnitude as the thickness of the upper edge of said lens.

"A lower bearing surface" means, in the context of the present invention, and as has already been indicated above, a "single bearing surface, placed in the lower portion of the lens".

Because of its thinness, the lower area of the lens according to the invention is capable of passing beneath the edge of the lower eyelid.

Therefore, while the lower bearing surface continues, as in the prior art, to fulfill its function as an abutment against the edge of the lower eyelid, the thin lower area makes it possible, for its part, to make the lower edge of the lens similar to its upper edge, and therefore to have the same level of mechanical and physiological compatibility with the eye as this upper edge.

According to other optional features of the lens according to the invention:
- said recess is defined by a combination of concave radii and convex radii;
- said lens is rigid, soft or a mixture of the two (rigid+soft);
- said soft lens has an opening-out formed on its inner face and leading onto its upper edge: such an opening-out promotes the translation of the lens by the choice of a radius matching that of the white of the eye and promotes the flow of tears;
- said opening-out extends over an angular sector of between 40° and 140°, and over a variable radial distance;
- said lens comprises at least one channel on its inner face, for allowing tear circulation;
- said lens comprises one channel located in said thin area;
- said lens comprises three channels located on its inner face;
- said lower bearing surface extends over an angular sector of between 200° and 340° : such an angular extension allows an optimal stabilization of the lens;
- the radial distance taken at 270° separating said lower bearing surface from the lower edge of said area is between 0.2 and 2 mm.
- the ratio between the respective thicknesses of said lens taken radially just inside and just outside said lower bearing surface is between 3 and 5;
- the diameter of said lens is between 8 and 16 mm;
- the radius of curvature of the inner face of said lens is between 4 and 12 mm.

BRIEF DESCRIPTION OF THE DRAWINGS

Other features and advantages of the present invention will appear in the light of the following description and on examination of the appended figures in which:

FIG. 6d is a magnified view of detail D6 of FIG. 6c, FIGS. 7a, 7b, 7c are respectively front view, view from the top and section view along line VII-VII of and other embodiment of a lens according to the invention, FIG. 7d is a magnified view of detail D7 of FIG. 7c.

DETAILED DESCRIPTION

In all of these figures, identical or similar reference numbers indicate identical or similar members or sets of members.

Figure 1:
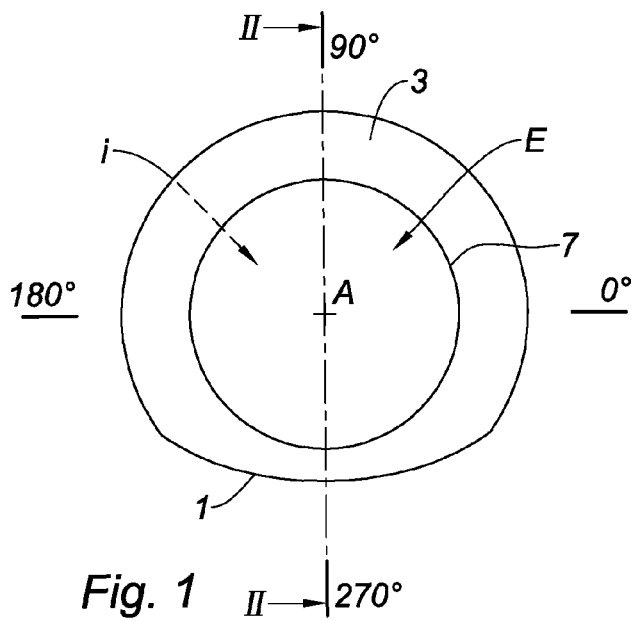
FIG. 1 is a front view of a lens of the prior art, as described in the preamble to the present description.
Figure 3:
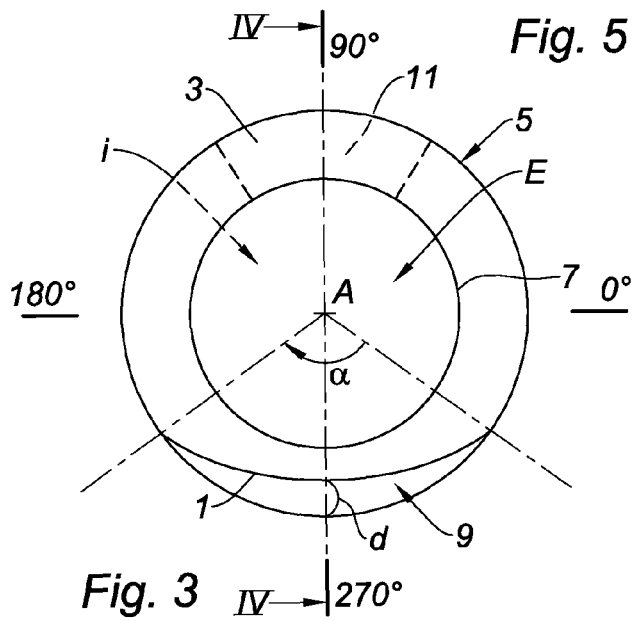

As can be seen in FIGS. 1 and 3, it is normal to refer to a lens by angular indications, the values 0° and 180° indicating portions of the lens designed to be applied respectively to the left and the right of an eye, and the values 90° and 270° indicating portions of this lens designed to be applied respectively to the top and the bottom of the eye.

"Upper" and "lower" used in the context of the present patent indicate zones of a lens situated respectively in the vicinity of the angular values 90° and 270°.

"Inner face" indicates the concave face i of the lens designed to be applied to the eye, and "outer face" indicates the other face E of the lens.

As can be seen in FIG. 3, the edge 5 of the lens according to the invention has a generally circular shape.

The circle defined by this edge may typically have a diameter of between 8 and 16 mm.

The circular line 7 represents the optically active zone of this lens, that is to say the zone of this lens designed to be used by the eye.

The diameter of this optically active zone may typically be situated between 4 and 13 mm.

The radius of curvature of the inner face i of the lens clearly depends on the curvature of the eye and may typically be between 4 and 12 mm.

Figure 4:
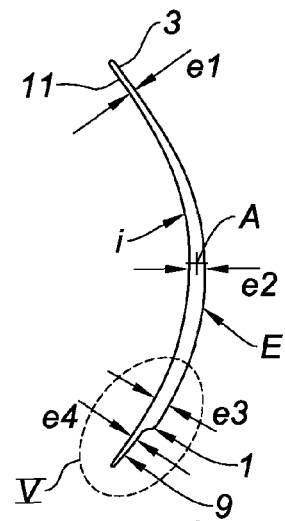

As can be seen in FIG. 4, the upper edge 3 of the lens is thin, that is to say suitable for being able to pass between the eye and the upper eyelid, the thickness e1 of this upper edge being able typically to be of the order of 0.12 mm.

In the example shown, the thickness of the lens increases from its upper edge 3 to its center A, in order to reach a thickness of the order of 0.4 mm (a lens with a power of −3 diopters); this thickness then varies between the center A of the lens and the lower bearing surface 1 of the lens, in order to reach a value e3 of the order of 0.3 mm to 0.6 mm in the zone situated radially just inside the lower bearing surface 1.

Such a lens, provided as an illustrative and nonlimiting example, may typically be a bifocal lens suitable for the correction of farsightedness.

Figure 2:
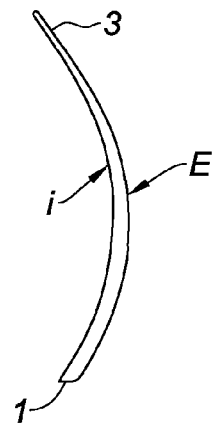
FIG. 2 is a view in section on the line II-II of the lens of FIG. 1, FIGS. 3 and 4 are views respectively similar to FIGS. 1 and 2 of a lens according to the invention.

Unlike the lens of the prior art that can be seen in FIGS. 1 and 2, the lens does not stop at its lower bearing surface 1: this bearing surface is actually extended downward (that is to say toward the zone situated at 270° by a thin area 9.

"Thin area" means a portion suitable for passing between the eye and the lower eyelid: the average thickness e4 of this area 9 is therefore of the same order of magnitude as the average thickness of the upper edge 3, namely of the order of 0.12 mm.

The ratio between the thicknesses e3 and e4 can typically be between 3 and 5.

While the inner face of the thin area 9 is identical to the rest of the inner face i of the lens, the outer face of this area 9 forms a recess relative to the rest of the outer face E of the lens: it is this recess defined according to an appropriate mathematical formula which defines the lower bearing surface 1, suitable for butting against the edge of the lower eyelid.

Figure 5:
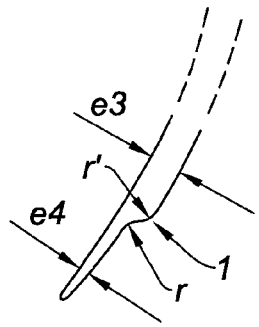
FIG. 5 is a detail view of the zone V of FIG. 4, FIGS. 6a, 6b, 6c are respectively front view, view from the bottom and section view along line VI-VI of and other embodiment of a lens according to the invention.

As can be seen in FIG. 5, this recess has radial sections with concave radii r and convex radii r', these sections allowing the outer surface of the thin area 9 to connect with the outer surface E of the lens.

Note that in the vicinity of the ends of this recess, the concavity of the radii r and r' can be reversed relative to that which is shown in FIG. 5.

As can be seen in FIG. 3, the thin area 9 can typically have an angular extension α of between 200° and 340°.

The lens according to the invention may be a rigid lens, a soft lens or a mixed lens, that is to say comprising both soft and rigid portions.

A rigid lens has a natural movement upward when the individual looks down, which is not the case in soft lenses.

In order to enhance this translation movement in a lens (wether it be soft or rigid), it is possible to produce an opening-out 11 on the inner face of the upper edge 3 of the lens, as can be seen on FIG. 3, which will have the effect to lighten the lens and thereby to ease its upward movement.

Such an opening-out is obtained by removing material from the lens, over an angular area that can typically be between 40° and 140°, and over a variable radial distance.

In order to facilitate the vertical translation of the lens (wether it be soft or rigid) over the surface of the eye, it can also be advisable to provide the lens with means to improve the circulation of tears between the eye and the the lens.

Therefore, as illustrated on FIGS. 6a, 6b, 6c, 6d a channel 13 can be provided in the thin area 9 of the lens, on the inner surface of the lens, which allows for draining of the tears.

This channel can have variable shape in section and profile (spherical, aspherical, symmetric).

In other possible embodiments, such as the one illustrated on FIGS. 7a, 7b, 7c, 7d several channels 13a, 13b, 13c can be positioned on the inner surface of the lens, typically at 120° as disclosed on these figures.

Such channels have the effect to improve the elimination of the corneal deposits under lenses, to decrease the phenomena of dehydration, to limit the dry eye sensation, and to allow to fit carriers with few tears.

The carrier benefit will be an improvement of its vision, its comfort and its tolerance.

The lens that has just been described can be produced by means of manometric lathes available in the specialist industry, such as the lathes of the OPTOFORM range marketed by STERLING.

As is known per se, the thin area 9, the recess 1 and the opening-out 11 can be obtained by means of cutting tools vibrating parallel to the axis of the lens, in a duly controlled manner.

The lens according to the invention may also be obtained by molding methods conventionally used in this technical field.

The method of use and the advantages of the lens according to the invention result directly from the foregoing description.

This lens is placed on the eye of an individual so that its inner face i comes into contact with this eye.

Because the center of gravity of the lens is closer to the thin area 9, the lens orients itself toward the bottom of the eye.

Because of the appropriate thicknesses e3 and e4, the lower bearing surface 1 butts against the edge of the lower eyelid when the individual moves his gaze downward.

In this situation, the thin area 9 for its part slides between the eye and the lower eyelid.

The butting of the lower bearing surface 1 on the edge of the lower eyelid allows the eye to travel downward behind the lens, and therefore to use the various optical correction zones provided on this lens.

For this "translation" to be easy in the particular case in which the lens is soft, it is of value to provide the opening-out 11 which makes it possible to make this translation of the lens toward the top of the eye easier.

The thinness of the upper edge 3 of the lens allows the upper eyelid to easily overlap the lens, when the wearing individual blinks their eyes.

Note finally that because the lower bearing surface 1 has a curve corresponding substantially to that of the edge of the lower eyelid, as can be seen in FIG. 3, this lens is able to rest in a particularly stable manner on the edge of the lower eyelid, thus limiting any risk that this lens will rotate on the eye.

In the light of the foregoing, it can be understood that, by virtue of the presence of the thin area 9, the lower edge of the lens according to the invention has a geometry similar to that of its upper edge, that is to say not very thick, markedly more compatible with the eye from a mechanical and physiological point of view than the lenses with the thick lower edge of the prior art.

Naturally, the present invention is in no way limited to the embodiment described and shown which is provided simply as an example.

The invention claimed is:

1. A contact lens comprising:
   at least two focal lengths,
   a single lower bearing surface capable of allowing the lens to be translated relative to an eye, and
   an area placed in the lower portion of the lens, the area having an outer face connected to a remainder of the outer face of the lens via a recess and the area having an inner face indistinguishable from the rest of an inner face of the lens, and the area having a lower edge,
   wherein said recess defines said lower bearing surface, and wherein a thickness of said area continuously decreases from said recess to said lower edge.

2. The contact lens as claimed in claim 1, wherein said recess is defined by a combination of concave radii and convex radii.

3. The lens as claimed in claim 1, wherein the lens is rigid, soft or a mixture of the two.

4. The lens as claimed in claim 3, wherein the lens has an opening-out formed on the inner face of the lens and leading onto the upper edge.

5. The lens as claimed in claim 4, wherein said opening-out extends over an angular sector of between about 40° and about 140°.

6. The lens as claimed in claim 1, further comprising at least one channel on the inner face of the lens, for allowing tear circulation.

7. The lens according to claim 6, further comprising one channel located in said thin area.

8. The lens according to claim 6, further comprising three channels located on the inner face of the lens.

9. The lens as claimed in claim 1, wherein said lower bearing surface extends over an angular sector of between about 200° and about 340°.

10. The lens as claimed in claim 1, wherein a radial distance taken at 270° separating said lower bearing surface from the lower edge of said area is between 0.2 and 1.5 mm.

11. The lens as claimed in claim 1, wherein a ratio between respective thicknesses of said lens taken radially just inside and just outside said lower bearing surface is between 3 and 5.

12. The lens as claimed in claim 1, wherein its diameter is between 8 and 16 mm.

13. The lens as claimed in claim 1, wherein a radius of curvature of the inner face of the lens is between 4 and 12 mm.

* * * * *